(12) United States Patent
Choi et al.

(10) Patent No.: US 11,866,035 B2
(45) Date of Patent: Jan. 9, 2024

(54) PERSONALIZED SAFE DRIVING ASSISTANCE METHOD AND SYSTEM

(71) Applicant: INFOCAR CO., LTD., Daejeon (KR)

(72) Inventors: Geo Seok Choi, Seoul (KR); Moon Kyu Choi, Seoul (KR); Geon Ho Pyo, Uijeongbu-si (KR); Guk Bin Lim, Uijeongbu-si (KR)

(73) Assignee: INFOCAR CO., LTD, Daejeon (KR)

( * ) Notice: Subject to any disclaimer, the term of this patent is extended or adjusted under 35 U.S.C. 154(b) by 585 days.

(21) Appl. No.: 17/045,988

(22) PCT Filed: Sep. 7, 2020

(86) PCT No.: PCT/KR2020/012005
§ 371 (c)(1),
(2) Date: Oct. 7, 2020

(87) PCT Pub. No.: WO2021/251554
PCT Pub. Date: Dec. 16, 2021

(65) Prior Publication Data
US 2022/0281441 A1  Sep. 8, 2022

(30) Foreign Application Priority Data

Jun. 9, 2020 (KR) .................. 10-2020-0069808

(51) Int. Cl.
*B60W 30/08* (2012.01)
*B60W 40/08* (2012.01)
(Continued)

(52) U.S. Cl.
CPC ............ *B60W 30/08* (2013.01); *B60W 40/08* (2013.01); *B60W 40/105* (2013.01);
(Continued)

(58) Field of Classification Search
None
See application file for complete search history.

(56) References Cited

U.S. PATENT DOCUMENTS

2018/0194280 A1* 7/2018 Shibata .............. G01C 21/3484
2019/0001964 A1* 1/2019 Lin ........................ B60W 30/02

* cited by examiner

*Primary Examiner* — James J Lee
*Assistant Examiner* — Andrew Sang Kim
(74) *Attorney, Agent, or Firm* — H.C. Park & Associates, PLC

(57) ABSTRACT

A personalized safe driving assistance method and system includes personalized safe driving information by determining a dangerous situation differently according to personal preference. A method includes the operations of collecting, for each of a plurality of collection target vehicles, information on a first risk determination factor to an N-th risk determination factor corresponding to the collection target vehicle during a predetermined measurement period, by a personalized safe driving assistance system (here, N is an integer greater than or equal to 3), modeling a standard safety area in an N-dimensional space expressed in an N-axis coordinate system orthogonal to each other on the basis of the information collected from the plurality of collection target vehicles during the measurement period, wherein each coordinate axis of the N-dimensional space corresponds to any one among the first risk determination factor to the N-th risk determination factor, by the personalized safe driving assistance system.

14 Claims, 10 Drawing Sheets

(51) Int. Cl.
  *B60W 40/105* (2012.01)
  *B60W 50/14* (2020.01)
(52) U.S. Cl.
  CPC ......... *B60W 50/14* (2013.01); *B60W 2420/42* (2013.01); *B60W 2540/225* (2020.02); *B60W 2554/4046* (2020.02); *B60W 2556/10* (2020.02)

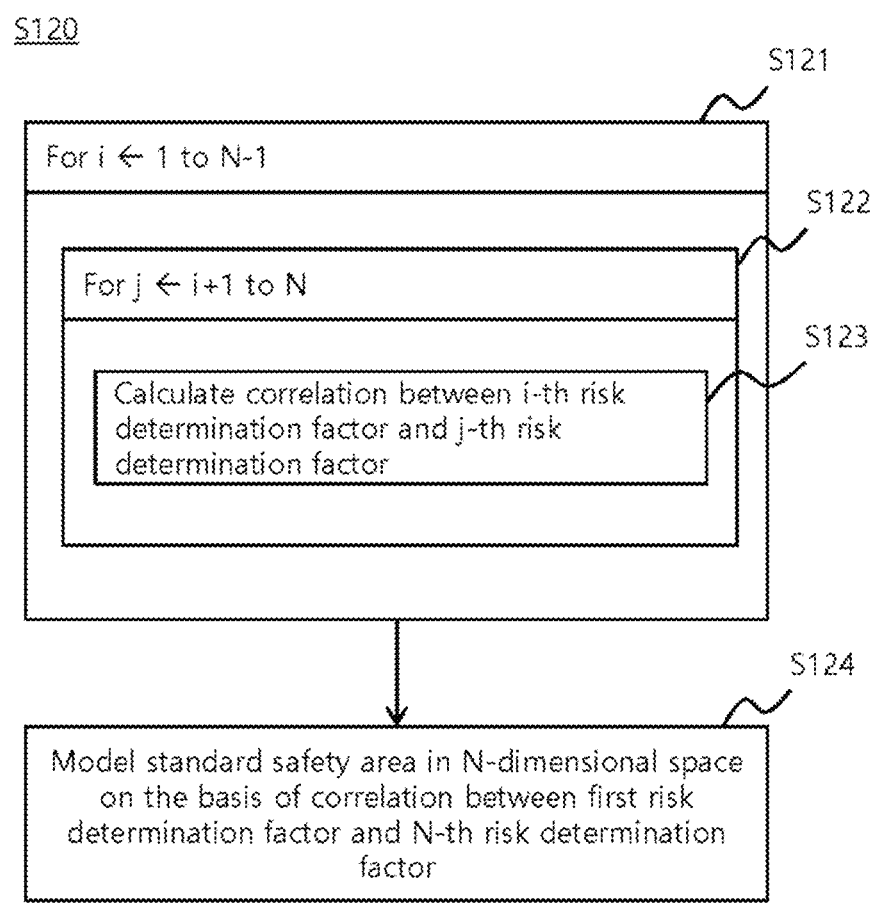

PERSONALIZED SAFE DRIVING ASSISTANCE METHOD AND SYSTEM

CROSS REFERENCE TO RELATED APPLICATION

This application is the National Stage Entry of PCT/KR2020/012005, filed on Sep. 7, 2020, which claims priority from and the benefit of Korean Patent Application No. 10-2020-0069808, filed on Jun. 9, 2020, which is hereby incorporated by reference for all purposes as if fully set forth herein.

BACKGROUND

Field

The inventive concepts relate to a personalized safe driving assistance method and system, and more specifically, to a personalized safe driving assistance method and system, which can provide personalized safe driving information by determining a dangerous situation differently according to personal preference.

Although safe driving assistance systems using state-of-the-art technologies of various fields are on the market for vehicle safety, the actual traffic accident reduction effect is insufficient because accurate driving situations cannot be reflected with only the information obtained from a single device. Because the safe driving assistance systems commercialized currently are very inconvenient for users due to misrecognition of a dangerous situation, the ratio of not using the systems after installation reaches 45% (American Automobile Association, 2016), and a new attempt for resolving the conflict between safety assistance functions and user convenience is required.

In addition, the automotive industry maintains continuous growth by utilizing momentum such as shared vehicles, electric vehicles, autonomous driving, connectivity and the like, and the vehicle data market using data generated from vehicles has also grown explosively and is expected to form a worth of about 750 trillion Korean Won in the next 10 years (McKinsey Report, 2016). However, the field of vehicle data is in lack of integrated data analysis platforms for generating information on accurate autonomous driving and safe driving from the perspective of B2C and personalized interfaces that can analyze a driver's style in an aspect of safe driving and economic driving from the perspective of business to business (B2B).

Existing safe driving assistance systems generate a warning for each risk factor, generate a warning for the sake of safety in a section where the risk is ambiguous, and apply the same standard of generating a warning for each individual risk factor. In addition, although the safe driving assistance systems using state-of-the-art technologies of various fields are on the market for vehicle safety, there is a disadvantage in that an exact driving situation may not be reflected because the safe driving assistance systems analyze a driving situation using only a single piece of information such as image processing, vehicle information or the like, and the actual traffic accident reduction effect is insufficient because the exact driving situation may not be reflected only with the information secured from one device.

The above information disclosed in this Background section is only for understanding of the background of the inventive concepts, and, therefore, it may contain information that does not constitute prior art.

SUMMARY

Additional features of the inventive concepts will be set forth in the description which follows, and in part will be apparent from the description, or may be learned by practice of the inventive concepts.

An object of the inventive concepts is to provide a personalized safe driving assistance system and method that can provide appropriate safe driving information to each individual driver by analyzing a correlation among various risk factors that can be obtained while a vehicle operates, generating a warning, and applying different warning criteria for each individual driver.

According to one aspect of the inventive concepts, there is provided a personalized safe driving assistance method including the operations of: collecting, for each of a plurality of collection target vehicles, information on a first risk determination factor to an N-th risk determination factor corresponding to the collection target vehicle during a predetermined measurement period, by a personalized safe driving assistance system (here, N is an integer greater than or equal to 3); modeling a standard safety area in an N-dimensional space expressed in an N-axis coordinate system orthogonal to each other on the basis of the information collected from the plurality of collection target vehicles during the measurement period, wherein each coordinate axis of the N-dimensional space corresponds to any one among the first risk determination factor to the N-th risk determination factor, by the personalized safe driving assistance system; determining a defensive driving level of a warning target vehicle driver on the basis of past driving data of the warning target vehicle driver driving a predetermined warning target vehicle, by the personalized safe driving assistance system; specifying a personalized safety area corresponding to the warning target vehicle driver on the basis of the defensive driving level of the warning target vehicle driver, by the personalized safe driving assistance system, wherein the personalized safety area is an area obtained by correcting the standard safety area on the basis of the defensive driving level of the warning target vehicle driver; periodically acquiring information on the first risk determination factor to the N-th risk determination factor corresponding to the warning target vehicle while the warning target vehicle is running, by the personalized safe driving assistance system; and determining whether there is a risk on the basis of the acquired information on the first risk determination factor to the N-th risk determination factor corresponding to the warning target vehicle and the personalized safety area corresponding to the warning target vehicle driver, by the personalized safe driving assistance system.

In an embodiment, modeling a standard safety area in an N-dimensional space expressed in an N-axis coordinate system orthogonal to each other on the basis of the information collected from the plurality of collection target vehicles during the measurement period may include calculating a correlation between an i-th risk determination factor and a j-th risk factor on the basis of the information collected from the plurality of collection target vehicles during the measurement period, wherein i is an integer of $1 \le i < N$, and j is an integer of $i < j \le N$); and modeling the standard safety area in the N-dimensional space on the basis of the calculated correlation between the i-th risk determination factor and the j-th risk determination factor, wherein i is an integer of 1<=i<N, and j is an integer of i<j<=N).

In an embodiment, specifying a personalized safety area corresponding to the warning target vehicle driver on the basis of the defensive driving level of the warning target vehicle driver may include specifying a personalized safety area corresponding to the warning target vehicle driver by expanding or reducing the standard safety area in the N-dimensional space on the basis of the defensive driving level of the warning target vehicle driver.

In an embodiment, the first risk determination factor to the N-th risk determination factor may include a driver's gaze angle, a driver's history of using a smartphone while driving, a speed of the vehicle, an angular speed of the vehicle, whether direction indicators of the vehicle are in operation, a distance between the vehicle and a vehicle in front, and a degree of departure from a lane of the vehicle.

In an embodiment, collecting information on a first risk determination factor to an N-th risk determination factor corresponding to the collection target vehicle may include collecting a driver image of the collection target vehicle from a camera installed in the collection target vehicle, and determining a gaze angle of the driver of the collection target vehicle on the basis of the collected image; collecting a history of using a smartphone of the driver of the collection target vehicle while driving from the smartphone; collecting a speed of the vehicle, an angular speed of the vehicle, and whether or not direction indicators of the vehicle are in operation from an On-BoardDiagnostics (OBD) installed in the collection target vehicle; collecting a distance to a vehicle in front from an inter-vehicle distance sensor installed in the collection target vehicle; and collecting a degree of departure from a lane of the collection target vehicle from a lane departure detection system installed in the collection target vehicle.

In an embodiment, the past driving data of the warning target vehicle driver may include at least some of an average speed, a sudden acceleration history, a sudden stop history, a lane change history, and an average inter-vehicle distance.

In an embodiment, the method may further include outputting a warning to the driver of the warning target vehicle on the basis of a result of determining whether there is a risk.

According to another aspect of the inventive concepts, there is provided a computer-readable recording medium configured to store a computer program to execute the method described above.

According to another aspect of the inventive concepts, there is provided a computer program installed in an information processing device and stored in a computer-readable recording medium configured to execute the method described above.

According to another aspect of the inventive concepts, there is provided a personalized safe driving assistance system including a processor and a memory configured to store a computer program, wherein the computer program, when being executed by the processor, allows the personalized safe driving assistance system to execute the method described above.

According to another aspect of the inventive concepts, there is provided a personalized safe driving assistance system including a collection module configured to collect for each of a plurality of collection target vehicles, information on a first risk determination factor to an N-th risk determination factor corresponding to the collection target vehicle during a predetermined measurement period (here, N is an integer greater than or equal to 3); a modeling module configured to model a standard safety area in an N-dimensional space expressed in an N-axis coordinate system orthogonal to each other on the basis of the information collected from the plurality of collection target vehicles during the measurement period, wherein each coordinate axis of the N-dimensional space corresponds to any one among the first risk determination factor to the N-th risk determination factor; a determination module to determine a defensive driving level of a warning target vehicle driver on the basis of past driving data of the warning target vehicle driver driving a predetermined warning target vehicle; a personalization module configured to specify a personalized safety area corresponding to the warning target vehicle driver on the basis of the defensive driving level of the warning target vehicle driver, wherein the personalized safety area is an area obtained by correcting the standard safety area on the basis of the defensive driving level of the warning target vehicle driver; an acquisition module configured to periodically acquire information on the first risk determination factor to the N-th risk determination factor corresponding to the warning target vehicle while the warning target vehicle is running; and a control module configured to determine whether there is a risk on the basis of the acquired information on the first risk determination factor to the N-th risk determination factor corresponding to the warning target vehicle and the personalized safety area corresponding to the warning target vehicle driver.

In an embodiment, the modeling module may calculate a correlation between an i-th risk determination factor and a j-th risk factor on the basis of the information collected from the plurality of collection target vehicles during the measurement period, wherein i is an integer of 1<=i<N, and j is an integer of i<j<=N), and model the standard safety area in the N-dimensional space on the basis of the calculated correlation between the i-th risk determination factor and the j-th risk determination factor, wherein i is an integer of 1<=i<N, and j is an integer of i<j<=N).

In an embodiment, the personalization module may specify a personalized safety area corresponding to the warning target vehicle driver by expanding or reducing the standard safety area in the N-dimensional space on the basis of the defensive driving level of the warning target vehicle driver.

In an embodiment, the first risk determination factor to the N-th risk determination factor may include a driver's gaze angle, a driver's history of using a smartphone while driving, a speed of the vehicle, an angular speed of the vehicle, whether direction indicators of the vehicle are in operation, a distance between the vehicle and a vehicle in front, and a degree of departure from a lane of the vehicle.

In an embodiment, the collection module may collect a driver image of the collection target vehicle from a camera installed in the collection target vehicle, determine a gaze angle of the driver of the collection target vehicle on the basis of the collected image, collect a history of using a smartphone of the driver of the collection target vehicle while driving from the smartphone, collect a speed of the vehicle, an angular speed of the vehicle, and whether or not direction indicators of the vehicle are in operation from an On-BoardDiagnostics (OBD) installed in the collection target vehicle, collect a distance to a vehicle in front from an inter-vehicle distance sensor installed in the collection target vehicle, and collect a degree of departure from a lane of the collection target vehicle from a lane departure detection system installed in the collection target vehicle.

In an embodiment, the past driving data of the warning target vehicle driver may include at least some of an average speed, a sudden acceleration history, a sudden stop history, a lane change history, and an average inter-vehicle distance.

In an embodiment, the system may further include a warning module configured to output a warning to the driver of the warning target vehicle on the basis of a result of determining whether there is a risk.

According to an embodiment of the inventive concepts, it is possible to provide a personalized safe driving assistance system and method that can provide appropriate safe driving information to each individual driver by analyzing a correlation between various risk factors that can be obtained while a vehicle runs and generating a warning, and applying different warning criteria for each individual driver.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

A brief description of each drawing is provided to more fully understand the drawings cited in the detailed description of the inventive concepts.

FIG. 5 is a flowchart illustrating a specific example of operation S120 of FIG. 4.

DETAILED DESCRIPTION

Figure 1:
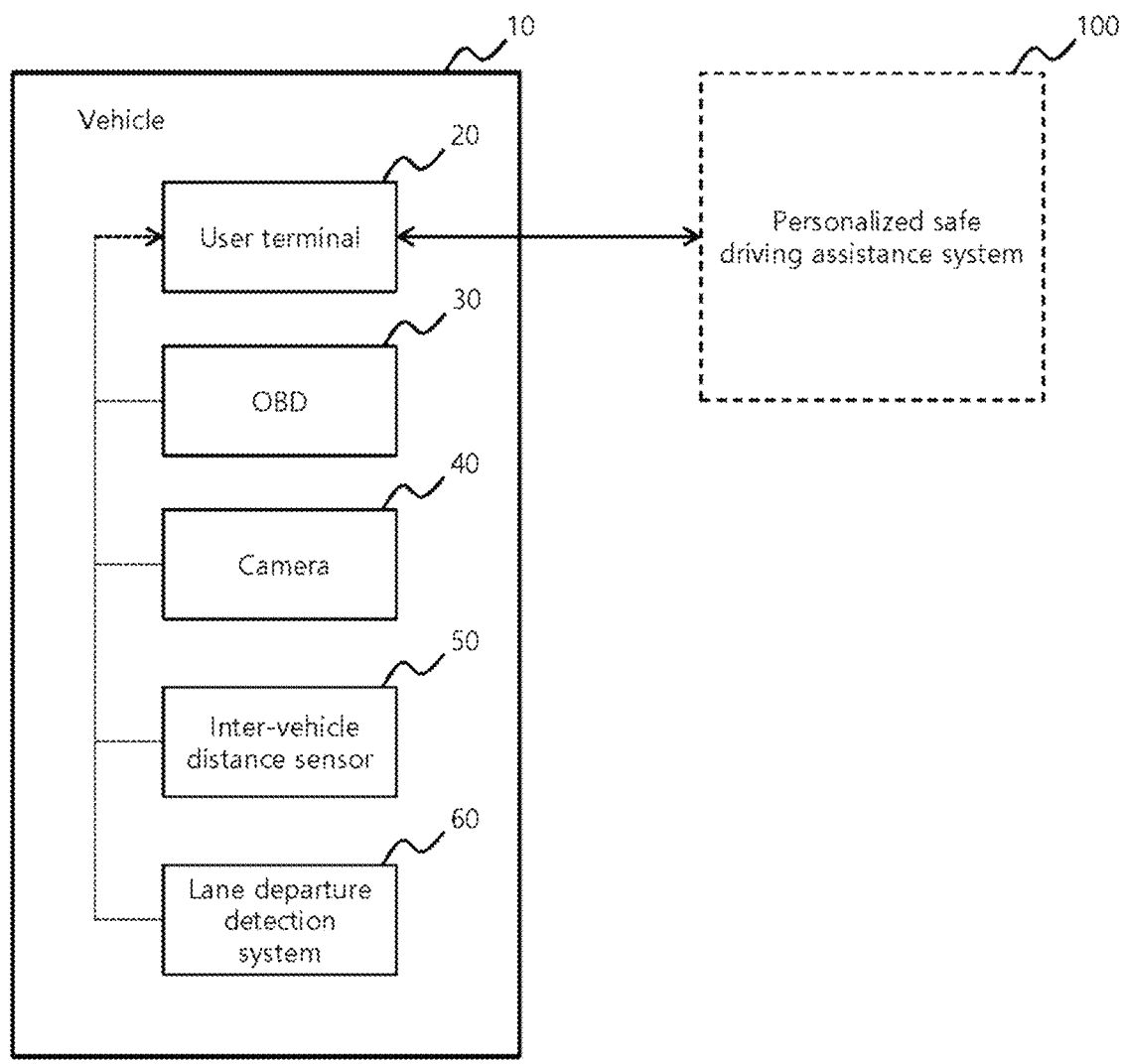
FIG. 1 is a view schematically illustrating an environment to execute a personalized safe driving assistance method according to an embodiment of the inventive concepts.

Because the inventive concepts may be diversely converted and have various embodiments, specific embodiments will be illustrated in the drawings and described in detail in the detailed description. However, it should be understood that this is not intended to limit the inventive concepts to the specific embodiments, but to include all conversions, equivalents and substitutions included in the spirit and scope of the inventive concepts. In describing the inventive concepts, if it is determined that the detailed description on the related known art may obscure the gist of the inventive concepts, the detailed description will be omitted.

The terms such as "first" and "second" can be used in describing various constitutional components, but the above constitutional components should not be restricted by the above terms. The above terms are used only to distinguish one constitutional component from the other.

The terms used in this application are used only to describe particular embodiments and are not intended to limit the inventive concepts. A singular expression includes at least one expression, unless the context clearly indicates otherwise.

In this specification, it should be further understood that the terms "include" and "have" specify the presence of stated features, numerals, steps, operations, constitutional components, parts, or a combination thereof, but do not preclude the presence or addition of one or more other features, numerals, steps, operations, constitutional components, parts, or a combination thereof.

In addition, in this specification, when any one of constitutional components "transmits" a data to another constitutional component, it means that the constitutional component may directly transmits the data to another constitutional component or may transmit the data to another constitutional component through at least one of the other constitutional components. On the contrary, when any one of the constitutional components directly transmits a data to another constitutional component, it means that the data is transmitted to another constitutional component without passing through the other constitutional components.

Hereinafter, the inventive concepts are described in detail focusing on the embodiments of the inventive concepts with reference to the attached drawings. Like reference symbols presented in each drawing denote like members.

FIG. 1 is a view schematically illustrating an environment to execute a personalized safe driving assistance method (hereinafter referred to as 'safe driving assistance method') according to an embodiment of the inventive concepts.

Referring to FIG. 1, in order to implement a safe driving assistance method according to an embodiment of the inventive concepts, a personalized safe driving assistance system 100 (hereinafter, referred to as 'safe driving assistance system') may be provided.

The safe driving assistance system 100 may be a computing system that performs data processing. Although the safe driving assistance system 100 may be, for example, a server, it is not limited thereto and may include various information processing devices capable of performing the safe driving assistance method according to the technical spirit of the inventive concepts.

The safe driving assistance system 100 may communicate with a user terminal 20 possessed by a driver driving the vehicle 10, and transmit and receive various information, signals and/or data used to implement the technical spirit of the inventive concepts. For example, the safe driving assistance systems 100 may be connected to each other through Wi-Fi, a cellular network, and the Internet.

The user terminal 20 may be an information processing device having a network communication function. For example, the user terminal 20 may be a desktop computer or a laptop computer, or a processing device including a handheld device such as a cellular phone, a satellite phone, a wireless phone, a Session Initiation Protocol (SIP) station, a Wireless Local Loop (WLL) station, a smart phone, a tablet PC, a Personal Digital Assistant (PDA) and the like.

An On-Board Diagnostics (OBD) 30, a camera 40, an inter-vehicle distance sensor 50, and/or a lane departure detection system 60 may be installed in the vehicle 10.

The safe driving assistance system 100 may collect various types of data from the OBD 30, the camera 40, the inter-vehicle distance sensor 50, and/or the lane departure detection system 60 installed in the vehicle 10, as well as the user terminal 20 possessed by the driver of the vehicle 10. To this end, in an embodiment, as illustrated in FIG. 1, the user terminal 20 may be connected to the OBD 30, the camera 40, the inter-vehicle distance sensor 50, and/or the lane departure detection system 60 through a wired or wireless network, acquire various information and/or data use to implement the technical spirit of the inventive concepts, and transmit the acquired information and/or data to the safe driving assistance system 100.

According to embodiments, of course, the safe driving assistance system 100 may be connected to the OBD 30, the camera 40, the inter-vehicle distance sensor 50 and/or the lane departure detection system 60 through a communication network and directly collect information without going through the user terminal 20.

Meanwhile, although FIG. 1 illustrates that the safe driving assistance system 100 collects information from one vehicle 10 for convenience of explanation, in reality, the safe driving assistance system 100 may collect data from one or a plurality of vehicles.

Figure 2:
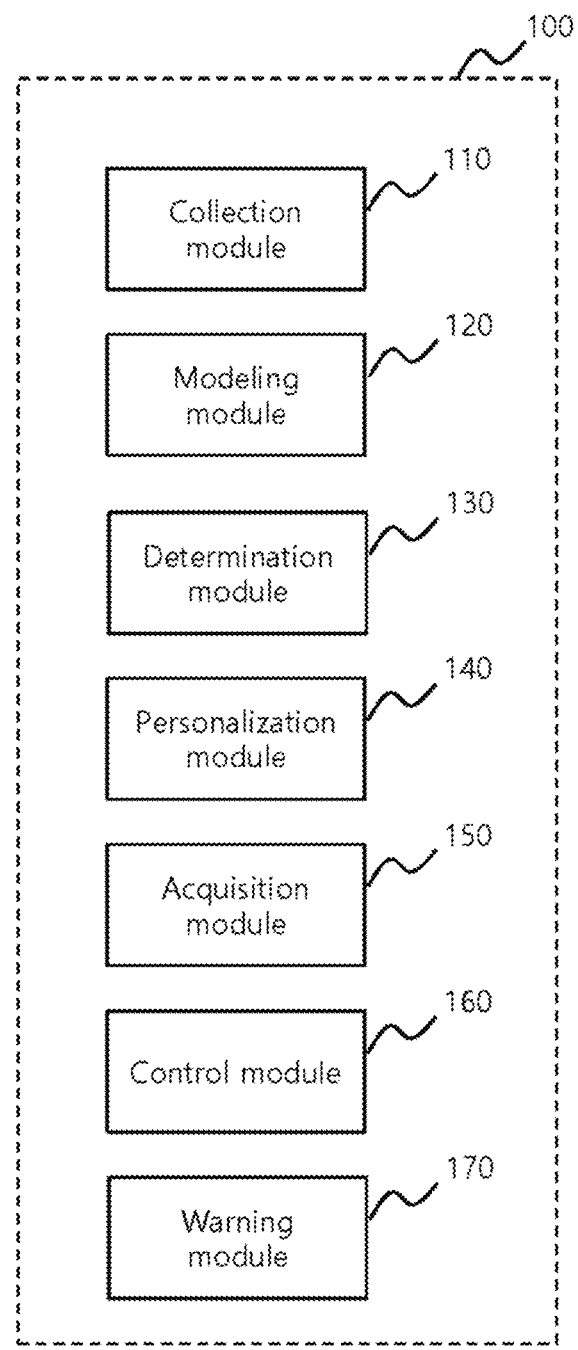
FIG. 2 is a block diagram illustrating a schematic configuration of a personalized safe driving assistance system according to an embodiment of the inventive concepts.

FIG. 2 is a block diagram illustrating a schematic configuration of a safe driving assistance system 100 according to an embodiment of the inventive concepts.

Referring to FIG. 2, the safe driving assistance system 100 may include a collection module 110, a modeling module 120, a determination module 130, a personalization module 140, an acquisition module 150, a control module 160, and a warning module 170. According to embodiments of the inventive concepts, some of the components described above may not necessarily correspond to components essential to implementation of the inventive concepts, and according to embodiments, of course, the safe driving assistance system 100 may include more components.

The safe driving assistance system 100 may include hardware resources and/or software used to implement the technical spirit of the inventive concepts, and it does not necessarily mean one physical component or one device. That is, the safe driving assistance system 100 may mean a logical combination of hardware and/or software provided to implement the technical spirit of the inventive concepts, and if necessary, it may be installed in devices spaced apart from each other and perform respective functions to be implemented as a set of logical components configured to implement the technical spirit of the inventive concepts. In addition, the safe driving assistance system 100 may mean a set of components separately implemented for each function or role to implement the technical spirit of the inventive concepts. In addition, a module in this specification may mean a functional and structural combination of hardware configured to perform the technical spirit of the inventive concepts and software configured to drive the hardware. For example, those skilled in that art may easily infer that the module may mean a logical unit of a specified code and a hardware resource configured to execute the specified code, and does not necessarily mean a physically connected code or a single type of hardware.

The control module 160 may control the functions and/or resources of other components (e.g., the collection module 110, the modeling module 120, the determination module 130, the personalization module 140, the acquisition module 150, the warning module 170, and the like) included in the user terminal 20.

The collection module 110 and the modeling module 120 may collect data and perform a process of modeling a standard safety area.

More specifically, for each of a plurality of collection target vehicles, the collection module 110 collects information on a first risk determination factor to an N-th risk determination factor (here, N is an integer greater than or equal to 3) corresponding to the collection target vehicle during a predetermined measurement period, and the modeling module 120 may model a standard safety area in an N-dimensional space expressed in an N-axis coordinate system orthogonal to each other on the basis of the information collected from the plurality of collection target vehicles during the measurement period. In this case, each coordinate axis of the N-dimensional space may correspond to any one among the first risk determination factor to the N-th risk determination factor.

In an embodiment, the first risk determination factor to the N-th risk determination factor may include a driver's gaze angle, a driver's history of using a smartphone while driving, a speed of the vehicle, an angular speed of the vehicle, whether the direction indicators of the vehicle are in operation, a distance between the vehicle and a vehicle in front, and a degree of departure from the lane of the vehicle.

In an embodiment, the collection module 110 may collect a driver image of the collection target vehicle from the camera 40 installed in the collection target vehicle, and determine a gaze angle of the driver of the collection target vehicle on the basis of the collected image. In addition, the collection module 110 may collect a history of using the smartphone 20 of the driver of the collection target vehicle while driving from the smartphone 20. In addition, the collection module 110 may collect a speed of the vehicle, an angular speed of the vehicle, and whether or not the direction indicators of the vehicle are in operation from the OBD 30 installed in the collection target vehicle, collect a distance to a vehicle in front from the inter-vehicle distance sensor 50 installed in the collection target vehicle, and collect a degree of departure from the lane of the collection target vehicle from the lane departure detection system 60 installed in the collection target vehicle.

In an embodiment, the modeling module 120 may calculate a correlation between an i-th risk determination factor and an j-th risk factor on the basis of the information collected from the plurality of collection target vehicles during the measurement period (here, i is an integer of $1<=i<N$, and j is an integer of $i<j<=N$), and model a standard safety area in the N-dimensional space on the basis of the calculated correlation between the i-th risk determination factor and the j-th risk determination factor (here, i is an integer of $1<=i<N$, and j is an integer of $i<j<=N$).

In another embodiment, the modeling module 120 may model a standard safety area through machine learning. For example, the standard safety area may be expressed as a neural network trained by deep learning or a Bayesian model trained by a Bayesian logistic regression method.

Meanwhile, the determination module 130 and the personalization module 140 may perform a process of personalizing the standard safety area.

More specifically, the determination module 130 may determine a defensive driving level of a warning target vehicle driver on the basis of past driving data of the warning target vehicle driver driving a predetermined warning target vehicle, and the personalization module 140 may specify a personalized safety area corresponding to the warning target vehicle driver on the basis of the defensive driving level of the warning target vehicle driver. At this point, the personalized safety area may be an area obtained by correcting the standard safety area on the basis of the defensive driving level of the warning target vehicle driver.

In an embodiment, the past driving data of the warning target vehicle driver may include at least some of an average speed, a sudden acceleration history, a sudden stop history, a lane change history, and an average inter-vehicle distance.

The defensive driving level is a graded or quantized degree of the driver's defensive driving, and although it may be divided into, for example, two levels of defensive and aggressive and three levels of defensive, neutral and aggressive, it is not limited thereto and may be divided into four or more levels.

In an embodiment, the personalization module 140 may specify a personalized safety area corresponding to the warning target vehicle driver by expanding or reducing the standard safety area in the N-dimensional space on the basis of the defensive driving level of the warning target vehicle driver.

Meanwhile, the acquisition module 150, the control module 160, and the warning module 170 may perform a risk detection and warning process while the vehicle is running.

More specifically, the acquisition module 150 may periodically acquire information on the first risk determination factor to the N-th risk determination factor corresponding to the warning target vehicle while the warning target vehicle is running, and the control module 160 may determine whether there is a risk on the basis of the acquired information on the first risk determination factor to the N-th risk determination factor corresponding to the warning target vehicle and the personalized safety area corresponding to the warning target vehicle driver.

In an embodiment, the control module 160 may determine that it is not dangerous when a point in the N-dimensional space expressed by the first risk determination factor to the N-th risk determination factor corresponding to the warning target vehicle is inside the personalized safety area corresponding to the warning target vehicle driver, and may determine that it is dangerous when the point in the N-dimensional space expressed by the first risk determination factor to the N-th risk determination factor corresponding to the warning target vehicle is outside the personalized safety area corresponding to the warning target vehicle driver.

The warning module 170 may output a warning to the driver of the warning target vehicle on the basis of a result of determining whether there is a risk.

Figure 3:
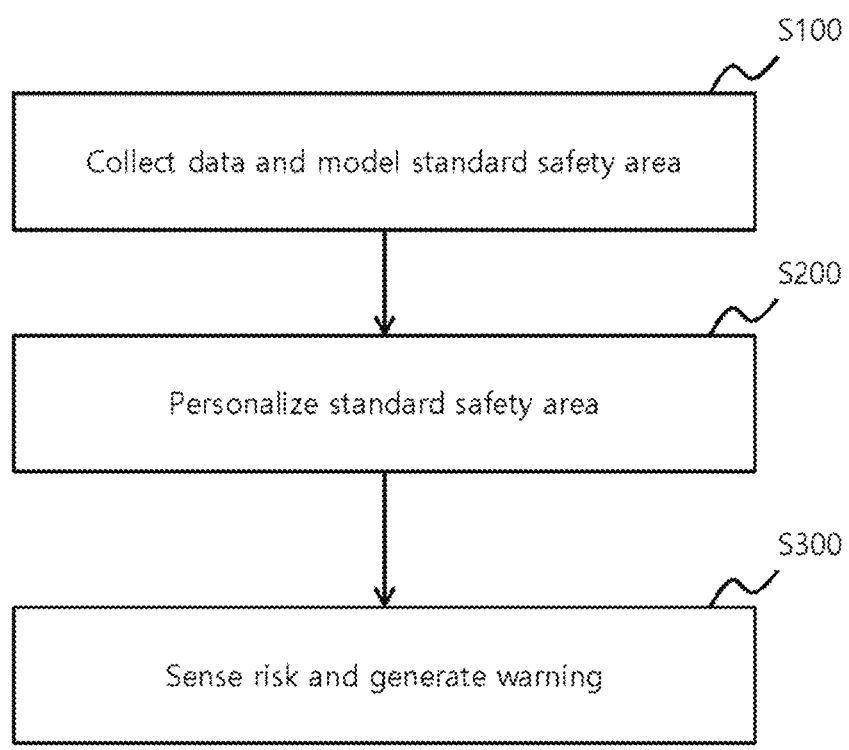
FIG. 3 is a flowchart illustrating the overall process of a personalized safe driving assistance method according to an embodiment of the inventive concepts.

FIG. 3 is a flowchart illustrating the overall process of a personalized safe driving assistance method according to an embodiment of the inventive concepts.

Referring to FIG. 3, the personalized safe driving assistance method may include an operation of collecting data and modeling a standard safety area (S100), an operation of personalizing the standard safety area (S200), and an operation of sensing a risk and generating a warning while a vehicle runs (S300).

Figure 4:
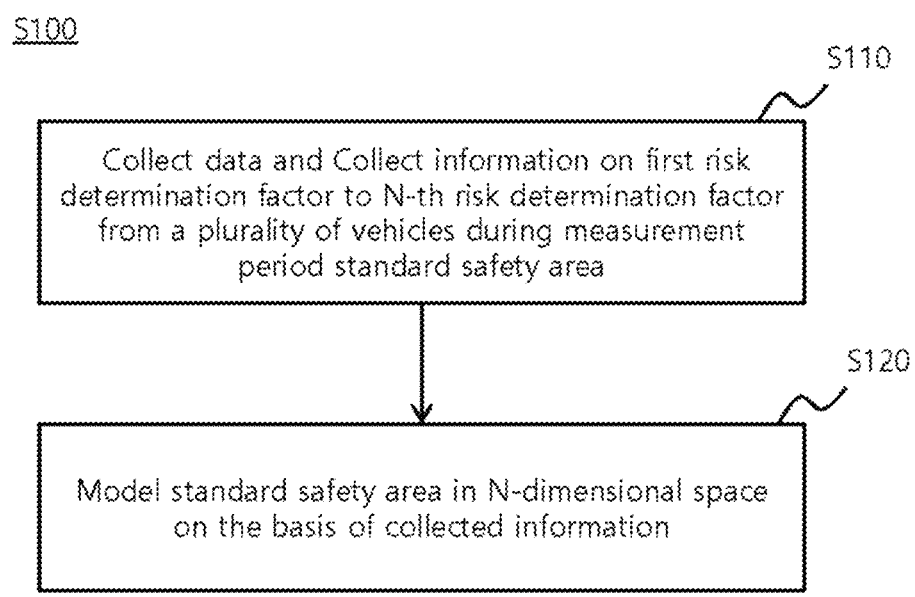
FIG. 4 is a flowchart illustrating a detailed process of the operation of collecting data and modeling a standard safety area.

FIG. 4 is a flowchart illustrating a detailed process of the operations of collecting data and modeling a standard safety area (S100).

Referring to FIG. 4, the safe driving assistance system 100 may collect, for each of a plurality of collection target vehicles, information on the first risk determination factor to the N-th risk determination factor corresponding to the collection target vehicle during a predetermined measurement period (here, N is an integer greater than or equal to 3) (S110).

Meanwhile, the safe driving assistance system 100 may model a standard safety area in an N-dimensional space expressed in an N-axis coordinate system orthogonal to each other on the basis of the information collected from the plurality of collection target vehicles during the measurement period, and each coordinate axis of the N-dimensional space may correspond to any one among the first risk determination factor to the N-th risk determination factor.

FIG. 5 is a flowchart illustrating a specific example of operation S120 of FIG. 4. Referring to FIG. 5, the safe driving assistance system 100 may calculate a correlation among the risk determination factors on the basis of the information collected from the plurality of collection target vehicles during the measurement period. That is, the safe driving assistance system 100 may calculate a correlation between the first risk determination factor and each of the other risk determination factors (i.e., the second risk determination factor to the N-th risk determination factor), a correlation between the second risk determination factor and each of the other risk determination factors (i.e., the third risk determination factor to the N-th risk determination factor), . . . , a correlation between the N−1-th risk determination factor and the other risk determination factor (i.e., the N-th risk determination factor) (see S121 to S123).

Thereafter, the safe driving assistance system 100 may model a standard safety area in the N-dimensional space on the basis of the calculated correlation among the first risk determination factor to the N-th risk determination factor (i.e., between an i-th risk determination factor and a j-th risk determination factor, where i is an integer of $1<=i<N$, and j is an integer of $i<j<=N$) (S124).

Figure 6A:
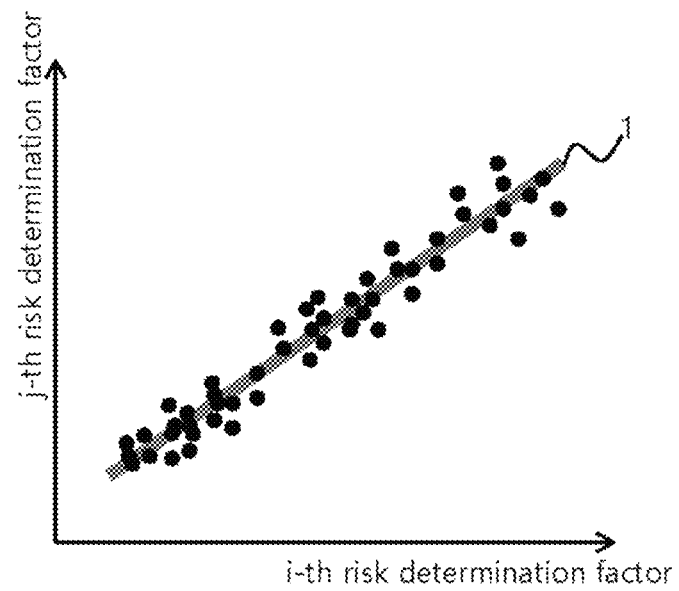
FIG. 6a is a view illustrating an example of a correlation between two risk determination factors.
Figure 6B:
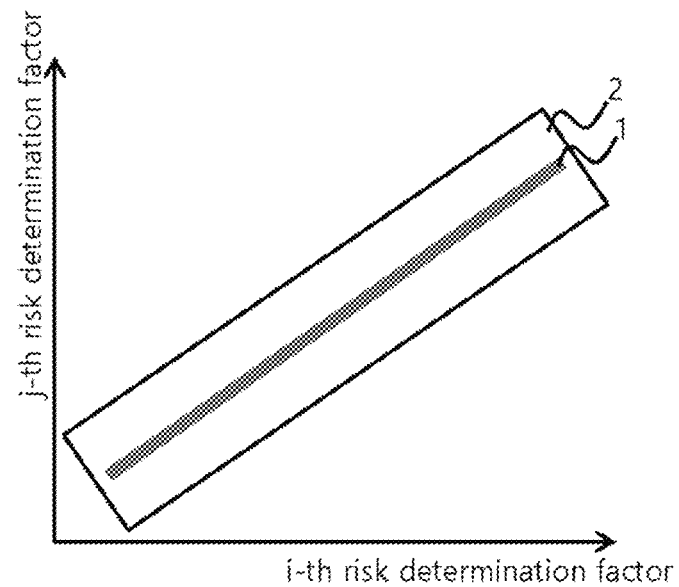
FIG. 6b is a view illustrating the relation between the correlation of FIG. 6a and a standard safety area.

FIG. 6a is a view illustrating an example of a correlation between two risk determination factors, and FIG. 6b is a view illustrating the relation between the correlation of FIG. 6a and a standard safety area.

The safe driving assistance system 100 may calculate a correlation between any two risk determination factors (an i-th risk determination factor and a j-th risk determination factor) through, for example, a linear regression analysis, and the calculated correlation may be expressed as the regression line 1 of FIG. 6a.

Meanwhile, FIG. 6b illustrates an i-axis and j-axis cross-sectional area 2 of the standard safety area modeled in the N-dimensional space. (Here, the i-axis is an axis corresponding to the i-th risk determination factor, and the j-axis is an axis corresponding to the j-th risk determination factor).

In an embodiment, the i-axis and j-axis cross-sectional area 2 of the modeled standard safety area may be a predetermined area around the regression line 1 expressing the correlation between the i-th risk determination factor and the j-th risk determination factor, as illustrated in FIG. 6b.

Those skilled in the art may easily extend the contents described above using an example of the two-dimensional areas illustrated in FIGS. 6a and 6b and examples that will be described below to an N-dimensional area.

Figure 7:
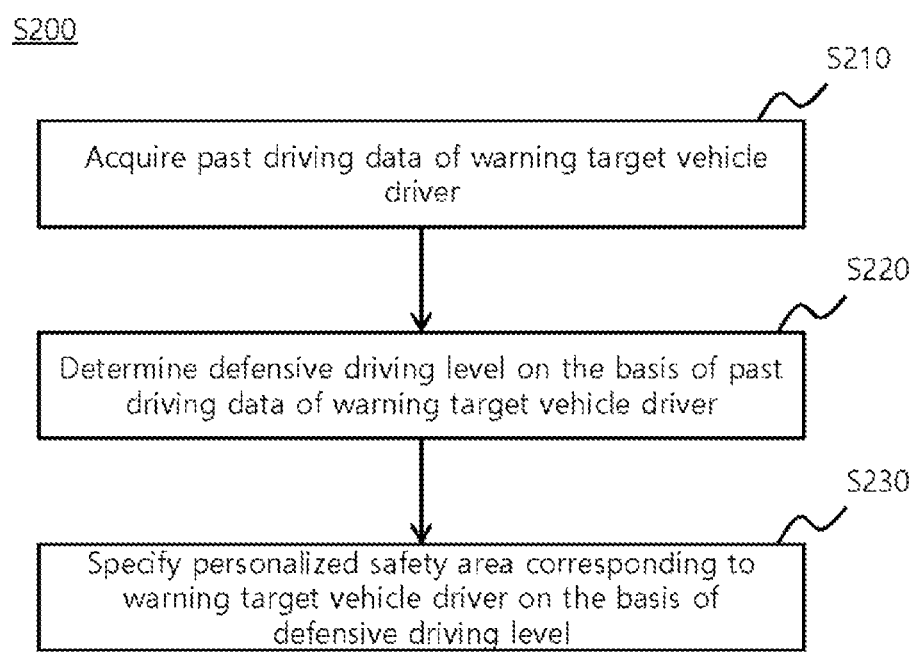
FIG. 7 is a flowchart illustrating a detailed process of the operation of personalizing a standard safety area.

FIG. 7 is a flowchart illustrating a detailed process of the operation of personalizing a standard safety area (S200). Referring to FIG. 7, the safe driving assistance system 100 may acquire past driving data of a warning target vehicle driver driving a predetermined warning target vehicle (S210).

Thereafter, a defensive driving level of the warning target vehicle driver may be determined on the basis of the past driving data of the warning target vehicle driver of the safe driving assistance system 100 (S220). For example, the safe driving assistance system 100 may determine any one among defensive, neutral, and aggressive as the defensive driving level of the warning target vehicle driver.

Meanwhile, the personalized safe driving assistance system 100 may specify a personalized safety area corresponding to the warning target vehicle driver on the basis of the defensive driving level of the warning target vehicle driver. In this case, the personalized safety area may be an area obtained by correcting the standard safety area on the basis of the defensive driving level of the warning target vehicle driver.

Figure 8:
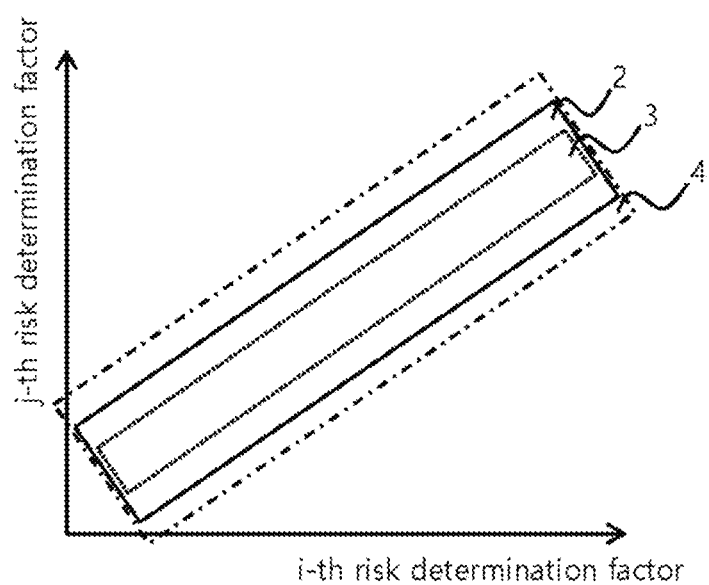
FIG. 8 is a view illustrating an example of differently determining a personalized safety area according to a defensive driving level.

FIG. 8 is a view illustrating an example of differently determining a personalized safety area according to a defensive driving level. As illustrated in FIG. 8, although the personalized safe driving assistance system 100 may specify the standard safety area 2 as a personalized safety area applied to a driver of a neutral level, an area 3 corrected to be narrower than the standard safety area 2 may be specified as the personalized safety area of a driver with an aggressive level, and an area 4 corrected to be wider than the standard safety area 2 may be specified as the personalized safety area of a driver with a defensive level.

Figure 9:
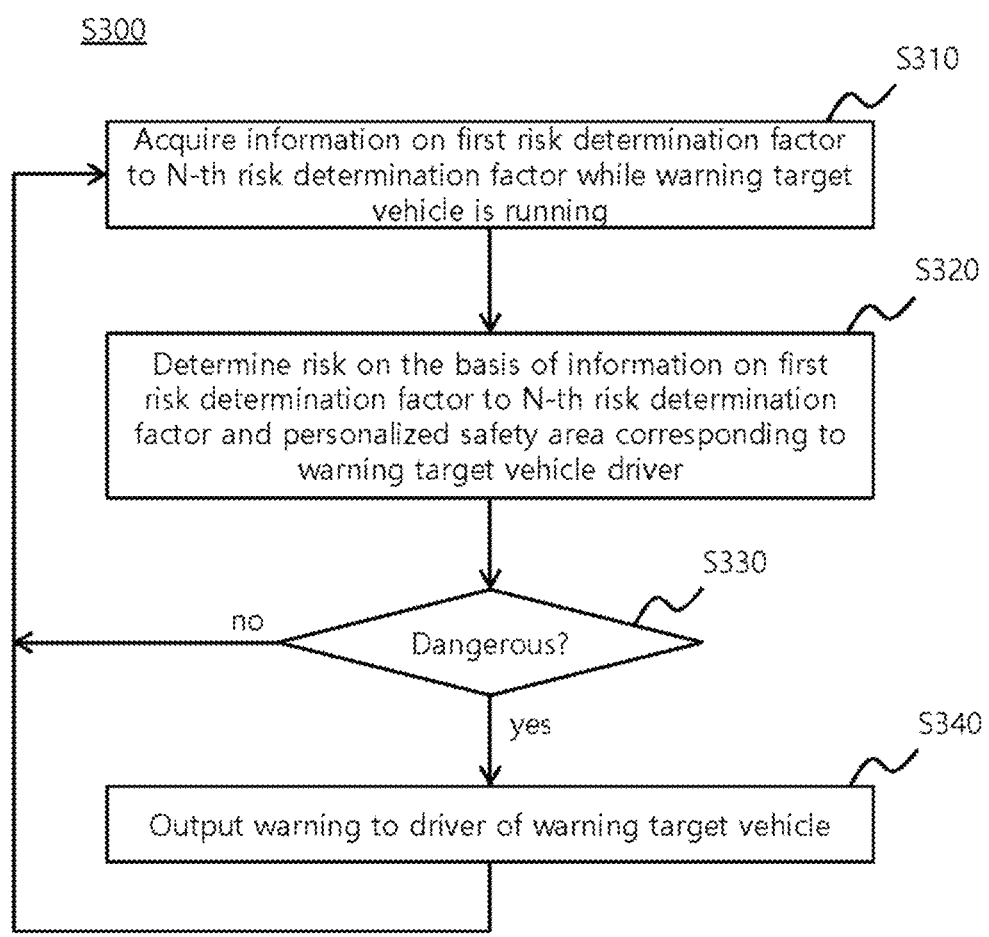
FIG. 9 is a flowchart illustrating a detailed process of the operation of sensing a risk and generating a warning while a vehicle runs.

FIG. 9 is a flowchart illustrating a detailed process of the operation of sensing a risk and generating a warning while a vehicle runs (S300).

Referring to FIG. 9, the personalized safe driving assistance system 100 may acquire information on a first risk determination factor to an N-th risk determination factor corresponding to the warning target vehicle while the warning target vehicle is running (S310).

The personalized safe driving assistance system 100 may determine whether there is a risk on the basis of the acquired information on the first risk determination factor to the N-th risk determination factor corresponding to the warning target vehicle and the personalized safety area corresponding to the warning target vehicle driver (S320) and output a warning to the driver of the warning target vehicle on the basis of a result of determining whether there is a risk (see S330 and S340).

More specifically, the personalized driving assistance system 100 may determine that it is not dangerous when a point in the N-dimensional space expressed by the first risk determination factor to the N-th risk determination factor corresponding to the warning target vehicle is inside the personalized safety area corresponding to the warning target vehicle driver, and may determine that it is dangerous when the point in the N-dimensional space expressed by the first risk determination factor to the N-th risk determination factor corresponding to the warning target vehicle is outside the personalized safety area corresponding to the warning target vehicle driver.

Figure 10:
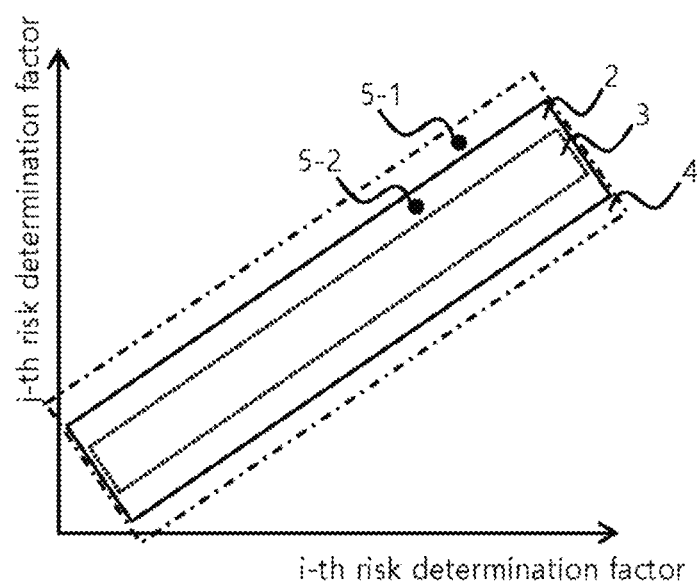
FIG. 10 is a view illustrating a method of determining whether there is a risk according to a risk determination factor.

FIG. 10 is a view illustrating a method of determining whether there is a risk according to a risk determination factor.

Referring to FIG. 10, when the acquired i-th risk determination factor and j-th risk determination factor are expressed by a point 5-1, the point 5-1 is in the personalized safety area 4 of a defensive driver and outside the personalized safety area 2 of a neutral driver and the personalized safety area 3 of an aggressive driver. Accordingly, although it is determined as not dangerous when the defensive driving level of the warning target vehicle driver is defensive, when the defensive driving level of the warning target vehicle driver is neutral or offensive, it may be determined as dangerous.

When the acquired i-th risk determination factor and j-th risk determination factor are expressed by a point 5-2, the point 5-2 is in the personalized safety area 4 of a defensive driver and the personalized safety area 2 of a neutral driver and outside the personalized safety area 3 of an aggressive driver. Accordingly, although it is determined as not dangerous when the defensive driving level of the warning target vehicle driver is defensive or neutral, when the defensive driving level of the warning target vehicle driver is offensive, it may be determined as dangerous.

Meanwhile, according to embodiments, the safe driving assistance system 100 may include a processor and a memory configured to store a program executed by the processor. Here, when the program is executed by the processor, the safe driving assistance system 100 according to the present embodiment may perform a visual object providing the safe driving assistance method described herein.

The processor may control hardware and/or software constituting the safe driving assistance system 100, and may include a CPU, a GPU, an MCU, a microprocessor and the like. The memory may include, for example, flash memory, ROM, RAM, EEROM, EPROM, EEPROM, hard disks, and registers.

Meanwhile, the visual object providing a safe driving assistance method according to an embodiment of the inventive concepts may be implemented in the form of a computer-readable program command and stored in a computer-readable medium, and control programs and target programs according to an embodiment of the inventive concepts may also be stored in the computer-readable medium. The computer-readable recording medium includes all kinds of recording devices in which data that can be read by a computer system can be stored.

The program command recorded in the recording medium may be a program command specially designed and configured for the inventive concepts or a program command known to and used by those skilled in the art of the software field.

The computer-readable recording medium includes, for example, magnetic media such as a hard disk, a floppy disk and a magnetic tape, optical recording media such as a CD-ROM and a DVD, magneto-optical media such as a floptical disk, and hardware devices specially configured to store and execute program commands, such as a ROM, a RAM, a flash memory and the like. In addition, the computer-readable recording medium may be distributed in computer systems connected through a network, and a code that can be read by a computer in a distributed manner can be stored and executed therein.

The program command includes, for example, a high-level language code that can be executed by a device that electronically processes information using an interpreter or the like, for example, a computer, as well as a machine code generated by a compiler.

The hardware devices described above can be configured to operate using one or more software modules in order to perform the operation of the inventive concepts, and vice versa.

It should be understood that the description of the inventive concepts described above is for illustrative purposes and those skilled in the art can easily modify the inventive concepts in other specific forms without changing the technical spirit or essential features of the inventive concepts. Accordingly, it should be understood that the above-described embodiments are only exemplary and are not restrictive. For example, each constitutional component described as a singular form may be embodied in a distributed form, and in the same manner, constitutional components described as being distributed may be embodied in a combined form.

The scope of the inventive concepts is represented by the claims described below rather than the detailed description described above, and it is to be interpreted that the meaning and scope of the claims and all the changes or modified forms derived from the equivalent concepts thereof are included in the scope of the inventive concepts.

The inventive concepts may be used in a personalized safe driving assistance method and system.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A personalized safe driving assistance method comprising: collecting, for each of a plurality of collection target vehicles, information on a first risk determination factor to an N-th risk determination factor corresponding to the collection target vehicle during a predetermined measurement period, by a personalized safe driving assistance system (here, N is an integer greater than or equal to 3);
    modeling a standard safety area in an N-dimensional space expressed in an N-axis coordinate system orthogonal to each other based on the information collected from the plurality of collection target vehicles during the measurement period, wherein each coordinate axis of the N-dimensional space corresponds to any one among the first risk determination factor to the N-th risk determination factor, by the personalized safe driving assistance system;
    determining a defensive driving level of a warning target vehicle driver based on past driving data of the warning target vehicle driver driving a predetermined warning target vehicle, by the personalized safe driving assistance system; specifying a personalized safety area corresponding to the warning target vehicle driver based on the defensive driving level of the warning target vehicle driver, by the personalized safe driving assistance system, wherein the personalized safety area is an area obtained by correcting the standard safety area based on the defensive driving level of the warning target vehicle driver;
    periodically acquiring information on the first risk determination factor to the N-th risk determination factor corresponding to the warning target vehicle while the warning target vehicle is running, by the personalized safe driving assistance system;
    determining whether there is a risk based on the acquired information on the first risk determination factor to the N-th risk determination factor corresponding to the warning target vehicle and the personalized safety area corresponding to the warning target vehicle driver, by the personalized safe driving assistance system; and
    outputting a warning to the driver of the warning target vehicle based on a result of determining whether there is the risk.

2. The method according to claim 1, wherein modeling the standard safety area in an N-dimensional space expressed in an N-axis coordinate system orthogonal to each other based on the information collected from the plurality of collection target vehicles during the measurement period includes:
    calculating a correlation between an i-th risk determination factor and a j-th risk factor based on the information collected from the plurality of collection target vehicles during the measurement period (i is an integer of $1<=i<N$, and j is an integer of $i<j<=N$); and
    modeling the standard safety area in the N-dimensional space based on the calculated correlation between the i-th risk determination factor and the j-th risk determination factor (i is an integer of $1<=i<N$, and j is an integer of $i<j<=N$).

3. The method according to claim 1, wherein specifying the personalized safety area corresponding to the warning target vehicle driver based on the defensive driving level of the warning target vehicle driver includes specifying the personalized safety area corresponding to the warning target vehicle driver by expanding or reducing the standard safety area in the N-dimensional space based on the defensive driving level of the warning target vehicle driver.

4. The method according to claim 1, wherein the first risk determination factor to the N-th risk determination factor include a driver's gaze angle, a driver's history of using a smartphone while driving, a speed of the vehicle, an angular speed of the vehicle, whether direction indicators of the vehicle are in operation, a distance between the vehicle and a vehicle in front, and a degree of departure from a lane of the vehicle.

5. The method according to claim 4, wherein collecting information on a first risk determination factor to an N-th risk determination factor corresponding to the collection target vehicle includes:
    collecting a driver image of the collection target vehicle from a camera installed in the collection target vehicle, and determining a gaze angle of the driver of the collection target vehicle based on the collected image;
    collecting a history of using a smartphone of the driver of the collection target vehicle while driving from the smartphone; collecting a speed of the vehicle, an angular speed of the vehicle, and whether or not direction indicators of the vehicle are in operation from an On-Board Diagnostics (OBD) installed in the collection target vehicle;
    collecting a distance to a vehicle in front from an inter-vehicle distance sensor installed in the collection target vehicle; and
    collecting a degree of departure from a lane of the collection target vehicle from a lane departure detection system installed in the collection target vehicle.

6. The method according to claim 1, wherein the past driving data of the warning target vehicle driver includes at least one of an average speed, a sudden acceleration history, a sudden stop history, a lane change history, and an average inter-vehicle distance.

7. A non-transitory computer-readable recording medium for storing a computer program for executing the method disclosed in claim 1.

8. A personalized safe driving assistance system comprising a processor and a memory for storing a computer program, wherein the computer program, when being executed by the processor, allows the personalized safe driving assistance system to execute the method disclosed in claim 1.

9. A personalized safe driving assistance system comprising:
    a collection module for collecting, for each of a plurality of collection target vehicles, information on a first risk determination factor to an N-th risk determination factor corresponding to the collection target vehicle during a predetermined measurement period (here, N is an integer greater than or equal to 3);

a modeling module for modeling the standard safety area in an N-dimensional space expressed in an N-axis coordinate system orthogonal to each other based on the information collected from the plurality of collection target vehicles during the measurement period, wherein each coordinate axis of the N-dimensional space corresponds to any one among the first risk determination factor to the N-th risk determination factor;

a determination module for determining a defensive driving level of a warning target vehicle driver based on past driving data of the warning target vehicle driver driving a predetermined warning target vehicle;

a personalization module for specifying a personalized safety area corresponding to the warning target vehicle driver based on the defensive driving level of the warning target vehicle driver, wherein the personalized safety area is an area obtained by correcting the standard safety area based on the defensive driving level of the warning target vehicle driver;

an acquisition module for periodically acquiring information on the first risk determination factor to the N-th risk determination factor corresponding to the warning target vehicle while the warning target vehicle is running;

a control module for determining whether there is a risk based on the acquired information on the first risk determination factor to the N-th risk determination factor corresponding to the warning target vehicle and the personalized safety area corresponding to the warning target vehicle driver; and a warning module for outputting a warning to the driver of the warning target vehicle based on a result of determining whether there is the risk.

10. The system according to claim 9, wherein the modeling module calculates a correlation between an i-th risk determination factor and a j-th risk factor based on the information collected from the plurality of collection target vehicles during the measurement period (i is an integer of $1<=i<N$, and j is an integer of $i<j<=N$), and models the standard safety area in the N-dimensional space based on the calculated correlation between the i-th risk determination factor and the j-th risk determination factor (i is an integer of $1<=i<N$, and j is an integer of $i<j<=N$).

11. The system according to claim 9, wherein the personalization module specifies the personalized safety area corresponding to the warning target vehicle driver by expanding or reducing the standard safety area in the N-dimensional space based on-the defensive driving level of the warning target vehicle driver.

12. The system according to claim 9, wherein the first risk determination factor to the N-th risk determination factor include a driver's gaze angle, a driver's history of using a smartphone while driving, a speed of the vehicle, an angular speed of the vehicle, whether direction indicators of the vehicle are in operation, a distance between the vehicle and a vehicle in front, and a degree of departure from a lane of the vehicle.

13. The system according to claim 9, wherein the collection module collects a driver image of the collection target vehicle from a camera installed in the collection target vehicle, determines a gaze angle of the driver of the collection target vehicle based on-the collected image, collects a history of using a smartphone of the driver of the collection target vehicle while driving from the smartphone, collects a speed of the vehicle, an angular speed of the vehicle, and whether or not direction indicators of the vehicle are in operation from an On-Board Diagnostics (OBD) installed in the collection target vehicle, collects a distance to a vehicle in front from an inter-vehicle distance sensor installed in the collection target vehicle, and collects a degree of departure from a lane of the collection target vehicle from a lane departure detection system installed in the collection target vehicle.

14. The system according to claim 9, wherein the past driving data of the warning target vehicle driver includes at least one of an average speed, a sudden acceleration history, a sudden stop history, a lane change history, and an average inter-vehicle distance.

\* \* \* \* \*